United States Patent
Das et al.

(10) Patent No.: US 7,509,653 B2
(45) Date of Patent: Mar. 24, 2009

(54) EFFICIENT AND SCALABLE EVENT PARTITIONING IN BUSINESS INTEGRATION APPLICATIONS USING MULTIPLE DELIVERY QUEUES

(75) Inventors: Pranta Das, Fremont, CA (US); Robert Tod Dimpsey, Austin, TX (US); Weiming Gu, Austin, TX (US); Edwin V. Sapugay, San Bruno, CA (US); Raghuram Thiagarajan, Cupertino, CA (US); Chendong Zou, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 1027 days.

(21) Appl. No.: 10/763,084

(22) Filed: Jan. 22, 2004

(65) Prior Publication Data
US 2005/0166187 A1 Jul. 28, 2005

(51) Int. Cl.
- G06F 3/00 (2006.01)
- G06F 9/44 (2006.01)
- G06F 9/46 (2006.01)
- G06F 13/00 (2006.01)
- G06F 7/00 (2006.01)
- G06F 17/30 (2006.01)
- G06Q 10/00 (2006.01)
- G06Q 30/00 (2006.01)

(52) U.S. Cl. .................. 719/318; 719/314; 705/1; 707/10

(58) Field of Classification Search ............. 719/314, 719/318, 313; 707/10, 100, 101, 104.1, 1; 705/1
See application file for complete search history.

(56) References Cited

U.S. PATENT DOCUMENTS

| | | | |
|---|---|---|---|
| 6,570,640 B1 * | 5/2003 | Garfinkle et al. | 355/40 |
| 6,892,199 B2 * | 5/2005 | Hong et al. | 707/10 |
| 2003/0144866 A1 * | 7/2003 | Pagliari et al. | 705/1 |
| 2005/0076059 A1 * | 4/2005 | Nomura et al. | 707/104.1 |

OTHER PUBLICATIONS

"An Early Look at Application Considerations Involved with MQSeries", Dec. 1994, International Technical Support Organization.*

Deborin et al., "WebSphere MQ in a z/OS Parallel Sysplex Environment" Oct. 2002, International Technical Support Organization.*

* cited by examiner

*Primary Examiner*—Thomas Lee
*Assistant Examiner*—Qing-Yuan Wu
(74) *Attorney, Agent, or Firm*—Herman Rodriguez; Dillon & Yudell LLP

(57) ABSTRACT

A business integration (BI) system receives business objects from a source application at an event partitioner. Event partitioner partitions received business objects into independent sets based on interdependent events, and allocates each independent group of business events to a separate event queue based a partitioning modulo reduction transformation of the independent sets to determine the correct event queue for storing a particular received business object. This transformation reduces the number of independent sets to a number of event groups equal to the number of allocated event queues. Events in different groups are delivered to an interchange server through the separate event queues so that they may be processed independently and in parallel, thus improving the overall performance of the interchange server, while guaranteeing that dependent events are processed in the correct serial order.

11 Claims, 4 Drawing Sheets

400

EFFICIENT AND SCALABLE EVENT PARTITIONING IN BUSINESS INTEGRATION APPLICATIONS USING MULTIPLE DELIVERY QUEUES

TECHNICAL FIELD

The present invention relates in general to business integration applications in a data processing system, and, in particular, to business integration software products used to integrate and provide communication between multiple software applications in server systems.

BACKGROUND

As new software applications are created, it is critical that businesses seamlessly integrate them with existing systems and applications, while facilitating the introduction of new business processes and paradigms. Also, the growth of e-business has created a significant need to integrate legacy applications and bring them to the Internet. Integrating new applications with existing applications is especially critical because industry analysts estimate that more than seventy-five percent of corporate data, including data highly relevant to e-commerce, lives on mainframe computers. Moreover, while many e-commerce transactions are initiated on end user platforms, they are ultimately completed on mainframe computers, running mainframe applications and impacting data stored on mainframe databases. Thus, it has become critical for many enterprises to more efficiently and powerfully integrate across the enterprise its multiple information technology systems that are implemented as stand-alone systems, each addressing particular business issues and having its own unique set of data.

Integrating legacy applications with new software is a difficult and expensive task due, in large part, to the need to customize each connection that ties together two disparate applications. There is no single mechanism to describe how one application may allow itself to be invoked by another. As a consequence, many business computing environments have multiple applications, developed by multiple development teams, running on different platforms, with different data types, data structures, commands and command syntaxes. These environments are stitched together with application program interfaces and connectors in conjunction with collaboration software to facilitate business processes across the system. This growing interconnection of old and new software systems and applications has led to various middleware applications and connector applications, interface specifications, interface definitions, and code, especially for interconnection and interaction of markup languages (such as HTML, XML, Dynamic HTML, WML, and the like), through object oriented languages such as C++, with languages of legacy application server applications (such as COBOL). Connectors match interface requirements of disparate applications and map between disparate interfaces. One example for the application of such middleware is when a business integration configuration involves sharing customer and ordering information among two software applications produced by different vendors, for example, SAP and Clarify. For instance, where a SAP application retrieves new customer registration information and also receives an order from the customer, the business integration middleware needs to capture these business events, and then add the new customer and order information to a Clarify database. Examples of this type of business integration middleware are International Business Machines Corporation's Crossworlds and WBI (Websphere Business Integrator) products, which provide mechanisms for third-party application business integration.

Critical to the process of business integration and collaboration between multiple third-party applications is to understand and handle any interdependency of the business events being collaborated. Most often, this type of interdependency requires that the business events be handled serially if the result of the prior event affects the subsequent events. For example, a new customer registration event must be processed before the new customer's order event. Business integration applications such as WBI implement a process called "event sequencing" that provides correct parallel processing of business events in software component, such Business Object (BO) mapping, where such parallel processing of events, even interdependent events, is allowed, by insuring that processed events coming out of the software component preserves the exact chronological order of the original business events. A limitation of the event sequencing is that only one event queue and one event queue listener is used. While the event sequencing approach performs reasonably well under normal circumstances, this process becomes a bottleneck on parallel processing systems such as those utilizing symmetric multi-processing (SMP) because the single threaded event queue listener limits the ability to exploit the enhanced performance achieved by parallel processing.

SUMMARY

In accordance with the present invention, improved methods, systems and articles of manufacture for sequencing of business objects in preparation for parallel processing in application integration are disclosed. One preferred method of the present invention includes the steps of receiving a plurality of business objects, wherein each business object of the plurality of business objects is associated with an application; allocating each business object of the plurality of business objects to a data set of a plurality of data sets associated with the business object such that the data set contains all business objects of the plurality of business objects associated with the application; and partitioning the plurality of data sets into a plurality of groups such that each group of the plurality of groups contains one or more data sets of the plurality of data sets, wherein a number of groups of the plurality of groups is less than or equal to a number of data sets of the plurality of data sets.

All objects, features, and advantages of the present invention will become apparent in the following detailed written description.

BRIEF DESCRIPTION OF THE DRAWINGS

This invention is described in a preferred embodiment in the following description with reference to the drawings, in which like numbers represent the same or similar elements, as follows.

DETAILED DESCRIPTION OF PREFERRED EMBODIMENTS

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Figure 1:
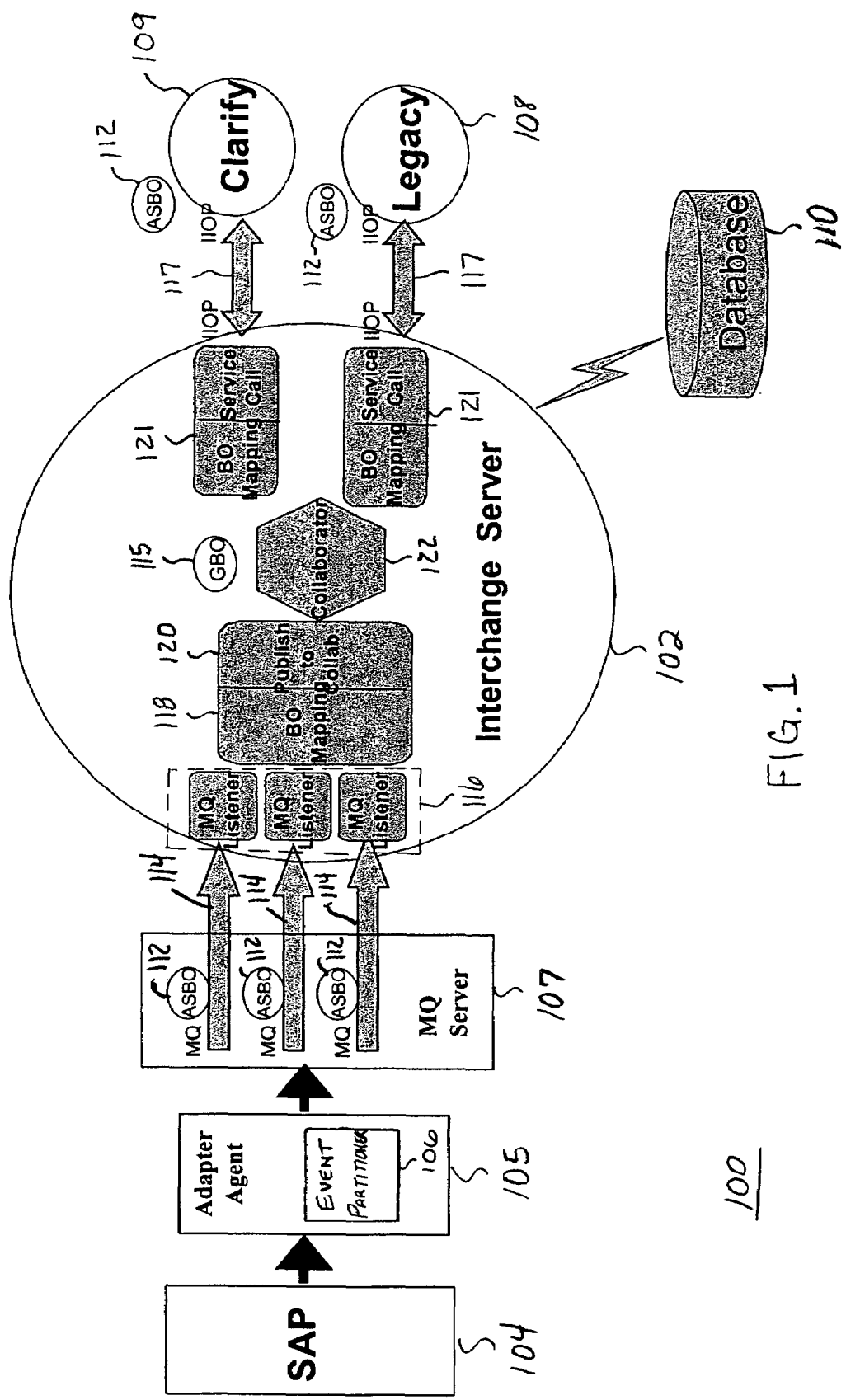
FIG. 1 depicts a block diagram of an architecture for providing business integration functionality, in accordance with a preferred embodiment of the present invention.

With reference now to the figures, and in particular with reference to FIG. 1, there is shown a block diagram of an architecture for providing business integration functionality in accordance with a preferred embodiment of the present invention. Business Integration (BI) system 100 contains Interchange Server 102 for integrating multiple disparate applications in the enterprise system, for example, such as SAP 104, Clarify 109 and legacy applications 108. The preferred embodiments of the invention are built on existing technologies for managing web services and for providing a business integration platform. Interchange Server 102 is the center piece of such an architecture, as in International Business Machines Corporation Crossworlds and WebSphere® Business Integrator enterprise application integration products. The preferred embodiment is built on the commercially available WebSphere® Business Integrator (WBI) product platform by International Business Machines Corporation. The WBI is used to integrate other software applications and is often referred to as business integration software or middleware. Functionally, WBI provides a communication mechanism between applications on different platforms, to connect different computer systems, over diverse geographical locations, and using dissimilar information technology infrastructures, and provide a seamless operation between the applications. BI system 100 provides integration for many business computing environments having multiple applications, developed by multiple development teams, running on different platforms, with different data types, data structures, commands and command syntaxes. Interchange Server 102 includes application program interfaces and connectors in conjunction with collaboration software to facilitate business processes across the system among the applications 104, 108, 109. The database 110 (for example, Oracle or DB2) serves as work-in-progress data storage, repository of configuration and programmable components and relationship information in the BI system.

Applications 104, 108, 109 generate business events, which are encapsulated into application-specific business objects (ASBO) 112, and are communicated between applications 104, 108, 109 via Interchange Server 102 through application adapter agent 105, messaging queue server (MQ server) 107 (for example, IBM's MQSeries and WebSphere MQ), and messaging queues (for example, the WebSphere MQSeries (MQ) products), also referred to as event queues, 114. Adapter agent 105 receives events from application 104 and creates ASBOs by querying the appropriate information from application 104. These ASBOs representing business events are then partitioned into independent groups utilizing event partitioner 106. Adapter agent 105 passes the partitioned business events to MQ server 107, in the form of ASBOs 112, for storage into allocated event queue within event queues 114. MQ server 107 presents the event queues 114 to a plurality of MQ listeners 116, which provide multiple threads for parallel processing by BO mapping 118. Each of the multiple listening threads in MQ listeners 116 handles business events coming from a uniquely associated event queue within event queues 114. Within Interchange Server 102, BO mapping 118 performs a conversion of the ASBOs into generic business objects (GBO) 115. The multi-processed GBOs 115 are then serialized by block 120 (published to collaboration) and sent to collaborator 122. Collaborator 122 executes a process called collaboration on received GBOs to perform specific business operations and other conversions of protocols, formats and commands to implement the interchange between the sourcing applications (104, 108, 109) and those applications (104, 108, 109) subscribing to Interchange Server 102 for access to such business events. The interfaces to applications 108, 109 include BO mapping/service call 121, which performs a conversion of the GBOs 115 to ASBOs 112 for communication over interfaces 117.

Figure 2:
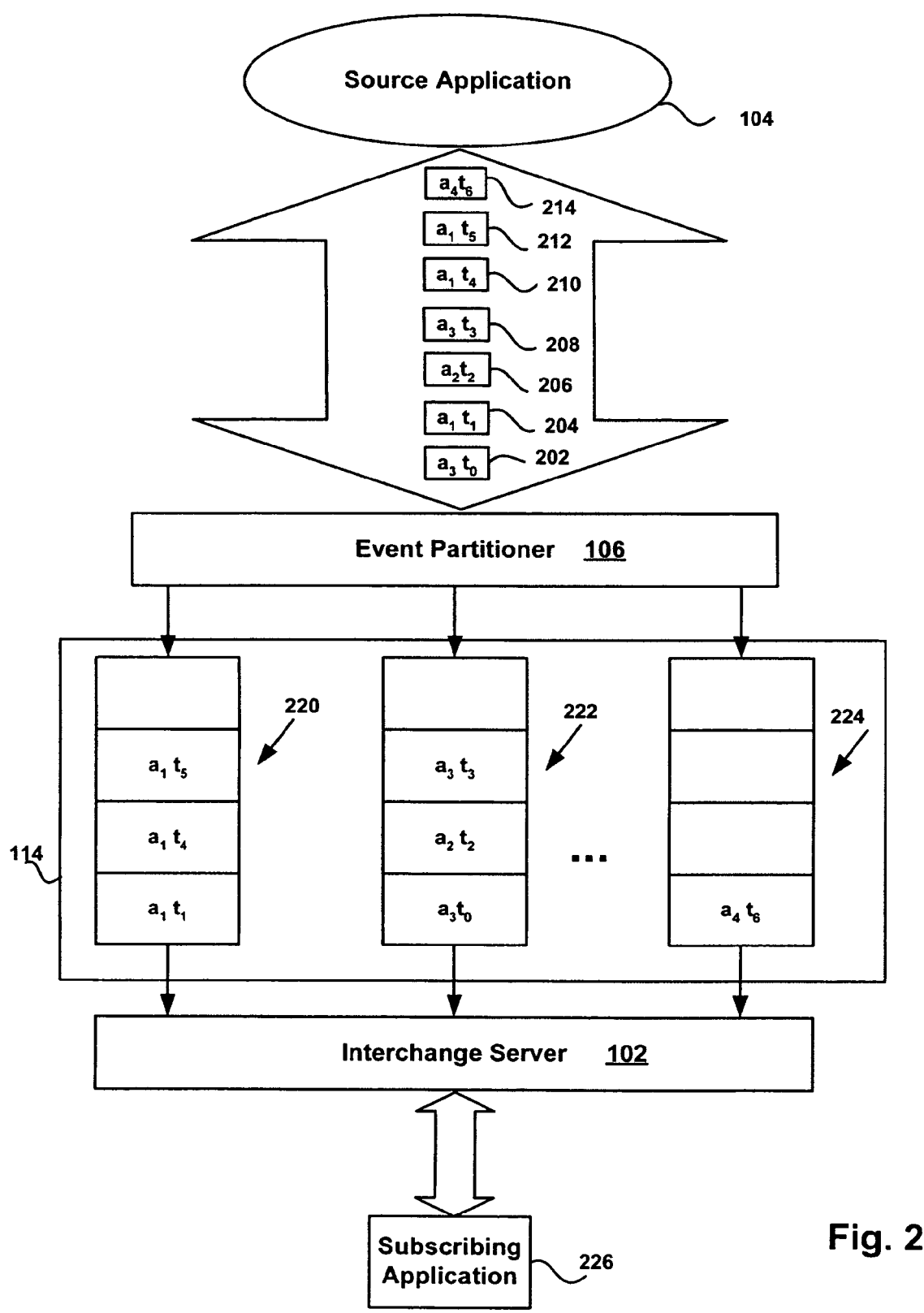
FIG. 2 shows a more detailed block diagram of a business integration system, in accordance with a preferred embodiment of the present invention.

FIG. 2 shows a more detailed block diagram of BI system 100, in accordance with a preferred embodiment of the present invention. Referring now to both FIGS. 1 and 2, source application 104 is sourcing business objects 202-214 to event partitioner 106, which partitions received business objects 202-214 into independent groups based on values of key attributes of the business objects. The BOs are then sent to event queues 220 to 224, with the only requirement that all events with each group are always sent to the same event queue, even after recovery from any unexpected system crash. For example, interdependent events $a_1 t_1$, $a_1 t_4$, and $a_1 t_5$, which might represent multiple updates to a specific customer's account that includes customer billing and order information, are always delivered to the same event queue 220 by adapter agent 105.

It will be appreciated that while only three event queues 220, 222, 224 are shown in FIG. 2, the invention may be implemented using any number of event queues 114 to partition incoming business events into multiple independent groups. Event queues 114 provide a direct delivery of each business object at the head of each event queue 220-224 to the MQ listeners 116 (see FIG. 1) within Interchange Server 102. Event partitioner 106 preserves the chronological order of ASBOs within each interdependent event group when delivering them to each of the event queues 220-224. This is required because events in the same group may be interdependent and consequently require maintenance of the relative sequence of issuance from application 104. Event sequencing implemented in interchange server 102 provides correct parallel processing of business events in BO mapping 118 and collaborator 122 by insuring that processed events coming out of BO mapping 118 preserves the exact chronological order of ASBOs with each interdependence event group. Maintaining this order of related events as they make their way through the Interchange Server 102 is extremely important for proper processing of the business events, for example updating to a customer's account balance must follow creation of the customer's account. The preferred embodiment maintains this event ordering, while enhancing the event sequencing technology by increasing the ability of the interchange server to process as many events in parallel as possible to utilize multiprocessing efficiency.

It will be appreciated that events in different groups delivered to interchange server 102 through separate event queues 114 may be processed independently and in parallel, thus improving the overall performance of Interchange Server 102, adapter agent 105 and MQ server 107. In a preferred embodiment, this enhanced performance is realized in interchange server 102, which comprises a symmetric multiprocessing (SMP) computing system that may perform parallel processing on multiple threads. Thus, business objects within separate queues are independent business events, and so may be processed in parallel by MQ listener 116 in interchange server 102 in addition to parallel processing enabled by the event sequencing technology, while guaranteeing that dependent events will be processed in the correct serial order within the system where such ordering is required like in collaborator 122.

Figure 3:
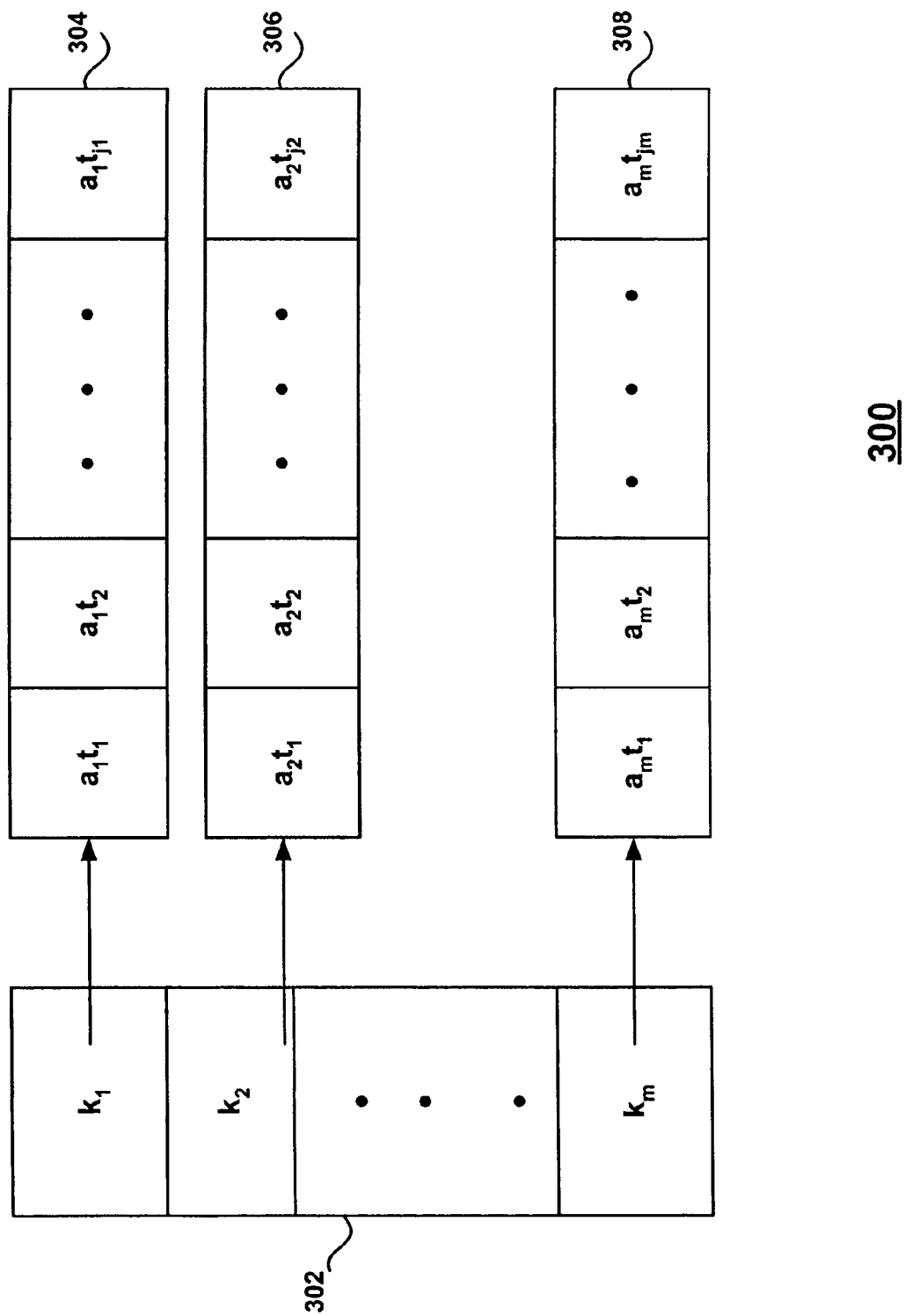
FIG. 3 shows a block diagram of an event lock table, in accordance with a preferred embodiment of the present invention.

A detailed description of event partitioner's 106 process of allocating each independent group of business events to a separate queue 220-224 within event queues 114 is now given with reference to FIGS. 1, 2 and 3. Event partitioner 106 first partitions each of the business objects 202-214 into one of the independent data sets 304-308 such that each business object 202-214 that has been assigned the same "application number" or "key attribute" embedded in the business object are interdependent, and therefore partitioned into the same data set. Event partitioner 106 partitions business object 202-214 into separate data sets based on the values of key attributes of the business objects. The key attributes for business objects are defined by the application developers or system integrators. For example, the "account id" attribute of bank account business objects may be designated as the key attribute. While the values of key attributes can be directly used in event partitioner 106 for partitioning business objects, in a preferred embodiment, for better performance, the hash values of business objects are used instead. The hash value of each business object is calculated by a hashing algorithm performed on the key attributes of each business object. The hashing algorithm always generates the same hash values for dependent business objects, those with the same key attribute value. The business events of the same hash values are correlated and allocated to the same data set 304-308. This process is implemented as depicted by the lock table 300 seen in FIG. 3.

Lock table 300 is stored within the system memory of Interchange Server 102 and contains a series of data sets 304-308 ($a_n t_j$), each corresponding to a set of related events (indicated by $a_n$, where "n" is an integer number from 1 to m) stored in their temporal order of arrival (indicated by $t_j$, where "j" is an integer positive number), and identified in association with their application number ($k_n$) listed in data set 302. It is important to point out that $t_j$ in $a_n t_j$ only indicates the relative temporal order within the data set in association with application number $k_n$. It is the $j^{th}$ event in the data set, which occurred after business event $a_n t_{i-1}$ and before business event $a_n t_{i+1}$. In particular, business events $a_1 t_j$ and $a_2 t_j$ may not have occurred at the same time. They happen to be the $j^{th}$ events in data sets in association with application numbers $k_1$ and $k_2$, respectively. It is also important to point out that the lock table 300 is a dynamic data structure. Business events are removed from the head of the data sets in the lock table as the business events are finished processing, and are appended at the end of the data sets in the lock table as new business events arrive at the BI. In a preferred embodiment, the primary key ($k_n$) is a hash value produced by the hash algorithm for each business object. Because of the hashing algorithm, multiple non-dependent business events can potentially share the same key, potentially resulting in some small loss of performance due to such false dependence, but all dependent business events for a given application will always be in the same data set. Thus, it will be appreciated that while business events in a particular data set may be dependent on each other and others might be independent, business events in different data sets that have correspondingly different hash values will always be independent.

In accordance with a preferred embodiment, event partitioner 106 then utilizes data sets 304-308 to selectively load business objects 202-214 into event queues 114 such that each event queue 220-224 exclusively receives its assigned one or more data sets 304-308 of business events as will be described below. Thus, for example, business objects corresponding to multiple updates to a specific customer's account are stored in the same data set so that relative time-based ordering is maintained, while completely unrelated updates to other customer's account balances or orders are stored in different data sets and can process in parallel.

In a system where the number of event queues equals the number of generated data sets, each data set would be stored in a corresponding event queue. However, because the number (m) of data sets 304-308 that a hash algorithm generates is typically very large compared to the configured number of event queues 220-224 physically present within event queues 114, the business objects must be assigned to event queues in a way that multiple data sets must occupy a given event queue. A preferred embodiment of event partitioner 106 implements a partitioning modulo reduction transformation of the event data sets 304-308 to determine the correct event queue for storing a particular received business object before loading the business objects 202-214. This modulo reduction transformation produces an "event queue number" ("i") assigned to a given data set as follows:

$$i = abs(k_j) \text{ modulo } n$$

where, i is the integer event queue number, and i=0, 1, 2, ... (n−1);

$k_j$ is the application number or primary key that identifies the data set, and j=0, 1, 2, ... (m−1);

m is an integer number identifying the number of unique data sets; and n is an integer number identifying the number of event queues.

Those event data sets 304-308 that produce the same event queue number from the transformation collectively are referred to as an "event group," wherein each event group includes one or more data sets 304-308. This transformation reduces the number of data sets 304-308 down to a number of event groups (n) that equals the number of allocated event queues 220-224. In a preferred embodiment, the number of allocated event queues is a configurable system property of BI system 100.

The following is an actual example of the hashing and modulo reduction transformation as might occur in the system of the preferred embodiment. An business application such as SAP creates new customer account information with a customer ID "CUST0213". The SAP adapter agent creates an ASBO for this business event, named "CUSTCONTACT", with its key attribute customer ID set to CUST0213. In the event partitioner, the hashing algorithm calculates the hash value of the ASBO of customer ID CUST0213 and gets the result of "329752". If there are three delivery queues configured between the SAP adapter agent and the Interchange Server, the modulo reduction algorithm transforms the hash value to "1". Therefore, the ASBO of customer ID CUST0213 is put on "event queue 1" (the other two queues being "0" and "2"), and then delivered to the Interchange Server.

Referring back now to FIG. 2, there is shown the example of a plurality of business objects 202-214 being partitioned into event queues 220-224. As represented in the example of FIG. 2, each of the business objects 202-214 is associated with a particular application (represented by "$a_i$," where i is an integer number identifying a particular application), and has a relative time-based sequence of when the event object was issued by source application 104 (represented by the identifier "$t_j$," where j is an integer number indicating a relative time). The use of time-based sequencing in FIG. 2 is only an example; it will be appreciated that other sequencing can be utilized to implement event sequencing. In the example shown, business object 212 is shown to be related to application $a_1$ and occurring at a time $t_5$; business object 210 is also related to application $a_1$ and occurred at a time $t_4$, prior to the time associated with business object 212. As seen in FIG. 2, event queues 114 are loaded with each of the independent event groups generated from lock table 300 by event partitioner 106 such that each business object in a given event group is sent to its corresponding event queue in event sequence. For example, event queue 220 has been loaded with business objects relating to application $a_1$ in event sequence $t_1, t_4, t_5$. Event queue 222 has been loaded with an event group of business objects generating the same modulo transformation that included $a_2$ and application $a_3$ and in event sequence $t_0, t_2, t_3$. Event queue 224 has been loaded with a separate event group related to application $a_4$.

It will be appreciated that because each of the business objects loaded within each event queue is independent from other business objects in other event queues, each of the event queues 114 can deliver data in parallel for processing by interchange server 102 without violating any dependency or coherency relationships, while business events contained within the same group are sent to interchange server 102 in event sequence through the same delivery queue 220-224. Thus, the interchange server 102 may start as many MQ listeners 116 as the number of event queues 114, allowing parallel processing among different MQ listeners. As will now be appreciated, the preferred embodiment of the present invention improves performance of the business integration application and the scalability of the business integrator server. This higher performance translates into a subscribing application 226 receiving its subscribed business event from Interchange Server 102 substantially sooner than in prior art systems.

Figure 4:
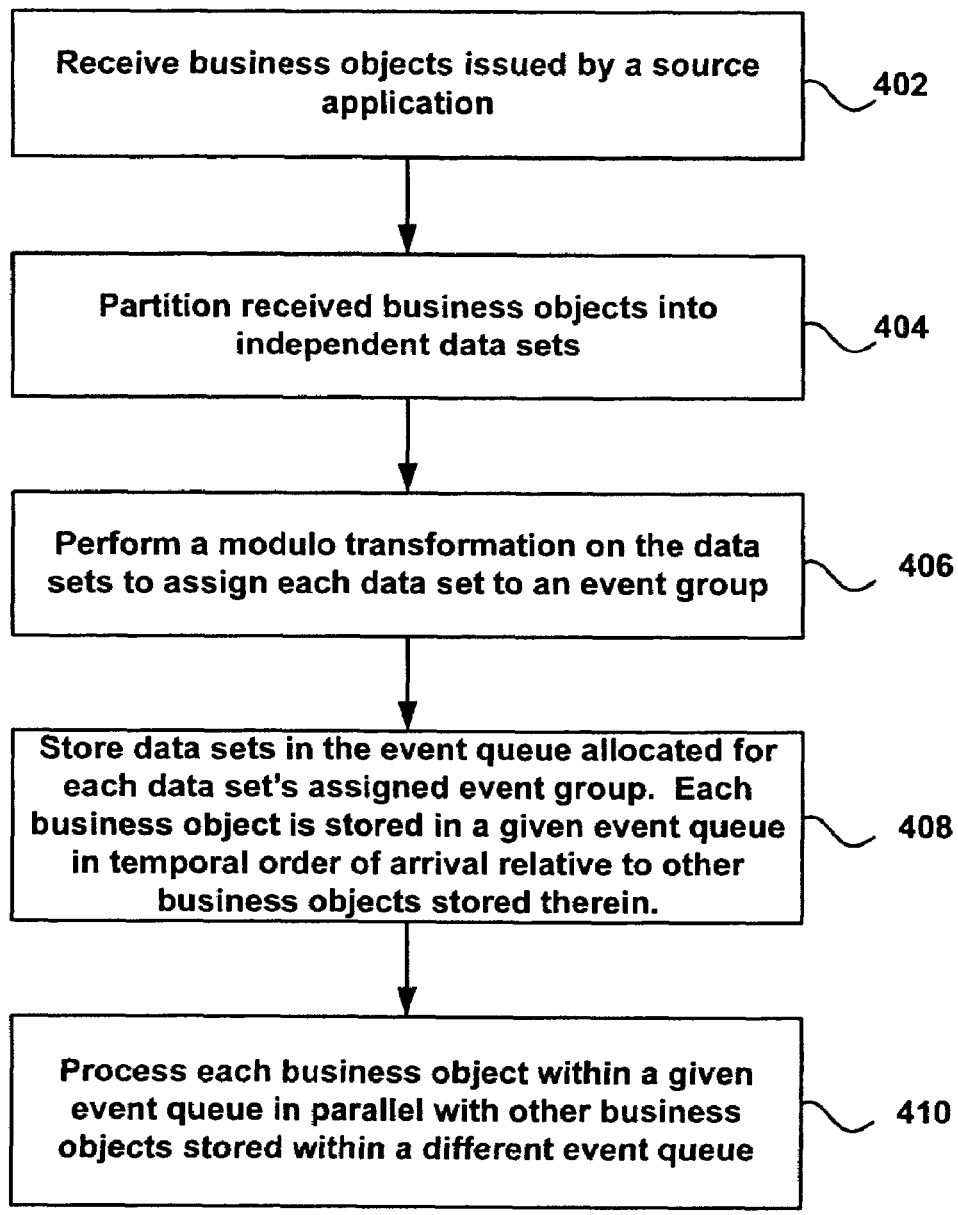
FIG. 4 shows a flow-diagram of a process of improved performance for enterprise application integration, in accordance with the preferred embodiment of the present invention.

With reference now to FIG. 4, there is shown a flow-diagram of a process of improved performance for enterprise application integration, in accordance with the preferred embodiment of the present invention. Process 400 begins when a business object is issued by a source application 104 within a BI system 100, as seen in step 402. At step 404, received business objects are partitioned into independent data sets. Partitioning is accomplished by performing a hash algorithm to determine the hash value of the received business object based on its key attributes, wherein all business objects that are related will result in the same hash value and collectively comprise a data set of related business objects. Depending upon the granularity of the hash algorithm selected for a given application, a number of business objects that are not dependent may end up with the same hash value, but in every case, business objects that are dependent will produce the same hash value. As will be appreciated, the number of data sets designated by the same hash values may exceed the number of available physical registers or queues used for storing business objects prior to implementing collaboration. Therefore, at step 406, a modulo reduction transformation is performed to index each of the data sets of related business objects partitioned by their key attribute values into a finite number of business event groups for storage in the event queues 114, wherein such number of event groups is no larger than, and preferably equal to, the number of event queues 114. At step 408, each business object is stored within the physical event queue allocated for the business object's associated event group, and in event sequence relative to other business objects in that event queue. Therefore, each business object is inserted within a given event queue in the temporal order of issuance relative to the other business objects that have been designated for storage within that event queue. Process 400 then ends at step 410, where the received business objects are processed in parallel with other business objects stored within other event queues. As will be appreciated, process 400 maintains dependencies and coherencies between related or dependent business events by enforcing event sequencing within each of the event queues to permit parallel processing within Interchange Server 102 without beaching any dependency or coherency relationship with other business objects in other event queues.

While the invention has been particularly shown and described with reference to a preferred embodiment, it will be understood by those skilled in the art that various changes in form and detail may be made therein without departing from the spirit and scope of the invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention. While this invention is described in terms of the best mode for achieving this invention's objectives, it will be appreciated by those skilled in the art that variations may be accomplished in view of these teachings without deviating from the spirit or scope of the present invention.

What is claimed is:

1. A method in a data processing system for sequencing of business objects in preparation for parallel processing in application integration, said method comprising the steps of:
   receiving a plurality of business objects, wherein each business object is associated with an application;
   allocating each business object to a data set of a plurality of data sets associated with the business object such that the data set contains all business objects associated with the application;
   partitioning the data sets into a plurality of groups such that each group contains one or more data sets, wherein there are less groups than there are data sets;
   wherein partitioning the data sets includes performing a modulo reduction transformation represented as:

$i = abs(k_j)$ modulo $n$, where, i is the integer event queue number, and i=0, 1, 2, ... (n−1);

$k_j$ is the application number that identifies the data set, and j=0, 1, 2, ... (m−1);

m is an integer number identifying the number of unique data sets; and n is an integer number identifying the number of event queues;

storing each group of the plurality of groups in a separate one of a plurality of event queues; and processing business objects contained within the same event queue of the plurality of event queues in series and business objects contained in different event queues of the plurality of event queues in parallel.

2. The method according to claim 1, wherein the plurality of business objects are received at an interface to a business integration application.

3. The method according to claim 1, wherein the step of allocating includes the step of performing a hash algorithm on an application number associated with a business object.

4. The method according to claim 1, wherein the number of groups is equal to a number of event queues of the plurality of event queues.

5. A data processing computer system having a processor and program logic for sequencing of business objects in preparation for parallel processing in application integration, the data processing system comprising:

an event partitioner having program logic that executes on the processor to perform the functions of:

receiving a plurality of business objects, wherein each business object of the plurality of business objects is associated with an application;

allocating each business object of the plurality of business objects to a data set of a plurality of data sets associated with the business object such that the data set contains all business objects of the plurality of business objects associated with the application, said data set stored in a machine readable storage medium, partitioning the plurality of data sets into a plurality of groups such that each group of the plurality of groups contains one or more data sets of the plurality of data sets, wherein a number of groups of the plurality of groups is less than a number of data sets of the plurality of data sets;

wherein partitioning the data sets includes performing a modulo reduction transformation represented as:

$i=abs(k_j)$ modulo $n$, where, i is the integer event queue number, and i=0, 1, 2, ... (n−1);

$k_j$ is the application number that identifies the data set, and j=0, 1, 2, ... (m−1);

m is an integer number identifying the number of unique data sets; and n is an integer number identifying the number of event queues;

directing event queues of a plurality of event queues to store each group of the plurality of groups in a separate one of the plurality of event queues; and receiving the plurality of business objects from the plurality of event queues and processes business objects contained within the same event queue of the plurality of event queues in series and business objects contained in different event queues of the plurality of event queues in parallel.

6. The data processing computer system according to claim 5, wherein the event partitioner is an interface to a business integration application.

7. The data processing computer system according to claim 5, wherein a number of event queues of the plurality of event queues is equal to the number of groups.

8. An article of manufacture comprising machine-readable medium including program logic embedded therein that causes control circuitry in a data processing system for sequencing of business objects in preparation for parallel processing in application integration to perform the steps of:

receiving a plurality of business objects, wherein each business object of the plurality of business objects is associated with an application;

allocating each business object of the plurality of business objects to a data set of a plurality of data sets associated with the business object such that the data set contains all business objects of the plurality of business objects associated with the application;

partitioning the plurality of data sets into a plurality of groups such that each group of the plurality of groups contains one or more data sets of the plurality of data sets, wherein a number of groups of the plurality of groups is less than a number of data sets of the plurality of data sets;

wherein partitioning the data sets includes performing a modulo reduction transformation represented as:

$i=abs(k_j)$ modulo $n$, where, i is the integer event queue number, and i=0, 1, 2, ... (n−1);

$k_j$ is the application number that identifies the data set, and j=0, 1, 2, ... (m−1);

m is an integer number identifying the number of unique data sets; and n is an integer number identifying the number of event queues;

storing each group of the plurality of groups in a separate one of a plurality of event queues; and processing business objects contained within the same event queue of the plurality of event queues in series and business objects contained in different event queues of the plurality of event queues in parallel.

9. The article of manufacture of claim 8, wherein the plurality of business objects are received at an interface to a business integration application.

10. The article of manufacture of claim 8, wherein the step of allocating includes the step of performing a hash algorithm on an application number associated with a business object.

11. The article of manufacture of claim 8, wherein the number of groups is equal to a number of event queues of the plurality of event queues.

* * * * *